United States Patent
Hannya et al.

(10) Patent No.: US 11,897,135 B2
(45) Date of Patent: Feb. 13, 2024

(54) HUMAN-COOPERATIVE ROBOT SYSTEM

(71) Applicant: FANUC CORPORATION, Yamanashi (JP)

(72) Inventors: Tsuyoshi Hannya, Yamanashi (JP); Manabu Hirakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 543 days.

(21) Appl. No.: 16/503,793

(22) Filed: Jul. 5, 2019

(65) Prior Publication Data

US 2020/0070342 A1 Mar. 5, 2020

(30) Foreign Application Priority Data

Aug. 30, 2018 (JP) .................................. 2018-161135

(51) Int. Cl.
*B25J 9/16* (2006.01)

(52) U.S. Cl.
CPC ............. *B25J 9/1633* (2013.01); *B25J 9/161* (2013.01); *B25J 9/1689* (2013.01)

(58) Field of Classification Search
CPC ........ B25J 9/1633; B25J 9/161; B25J 9/1689; B25J 9/1674; B25J 9/1694; B25J 13/085; Y10S 901/46; Y10S 901/10
See application file for complete search history.

(56) References Cited

U.S. PATENT DOCUMENTS

| | | | | |
|---|---|---|---|---|
| 10,098,701 B2 * | 10/2018 | Tsusaka | ................... | A61B 5/06 |
| 2009/0143913 A1 | 6/2009 | Kim et al. | | |
| 2012/0259464 A1 * | 10/2012 | Morioka | ................ | B25J 9/1674 |
| | | | | 700/254 |
| 2015/0174771 A1 | 6/2015 | Fujita | | |
| 2015/0314445 A1 * | 11/2015 | Naitou | ....................... | B25J 9/16 |
| 2016/0089790 A1 | 3/2016 | Wang et al. | | |
| 2016/0243705 A1 * | 8/2016 | Naitou | ................... | B25J 13/085 |
| 2017/0239815 A1 | 8/2017 | Haddadin | | |
| 2017/0285625 A1 | 10/2017 | Sato et al. | | |
| 2018/0326582 A1 * | 11/2018 | Yokoyama | ......... | G05B 19/4182 |

(Continued)

FOREIGN PATENT DOCUMENTS

| | | |
|---|---|---|
| JP | H06-246673 A | 9/1994 |
| JP | 2003-025272 A | 1/2003 |

(Continued)

OTHER PUBLICATIONS

Japanese Office Action dated Aug. 4, 2020 in corresponding Japanese Application No. 2018-161135; 11 pages; Machine translation attached.

*Primary Examiner* — Jeff A Burke
*Assistant Examiner* — Joshua Alexander Garza
(74) *Attorney, Agent, or Firm* — Maier & Maier, PLLC

(57) ABSTRACT

An aspect of the present invention prevents a robot from being subjected to an excessive load even when operated by an inexperienced user. Provided is a human-cooperative robot system including a robot and a control device that controls the robot. The robot is provided with a sensor that detect an external force applied to the robot. The control device stops the operation of the robot when the detected external force is equal to or greater than a first threshold, and issues a warning when the detected external force is equal to or greater than a second threshold exceeding the first threshold.

4 Claims, 7 Drawing Sheets

(56) References Cited

U.S. PATENT DOCUMENTS

| | | | |
|---|---|---|---|
| 2018/0354141 A1 | 12/2018 | Haddadin | |
| 2018/0361578 A1* | 12/2018 | Muneto | B25J 19/06 |
| 2020/0000536 A1* | 1/2020 | Yakimovich | B25J 19/06 |
| 2020/0016742 A1* | 1/2020 | Ishikawa | B25J 9/163 |
| 2020/0023519 A1* | 1/2020 | Kurze | B25J 9/1674 |

FOREIGN PATENT DOCUMENTS

| | | |
|---|---|---|
| JP | 2012-040626 A | 3/2012 |
| JP | 2013-138793 A | 7/2013 |
| JP | 2015-085492 A | 5/2015 |
| JP | 2015-123505 A | 7/2015 |
| JP | 2016-64474 A | 4/2016 |
| JP | 2016-072928 A | 5/2016 |
| JP | 2016-120561 A | 7/2016 |
| JP | 2016-203315 A | 12/2016 |
| JP | 2017-177293 A | 10/2017 |
| JP | 2017-530020 A | 10/2017 |
| WO | 2017/060540 A1 | 4/2017 |

* cited by examiner

HUMAN-COOPERATIVE ROBOT SYSTEM

CROSS-REFERENCE TO RELATED APPLICATIONS

This application is based on Japanese Patent Application No. 2018-161135, the contents of which are incorporated herein by reference.

FIELD

The present invention relates to a human-cooperative robot system.

BACKGROUND

In the related art, there is a known human-cooperative robot system with which a robot and a human share a work space (for example, see Japanese Unexamined Patent Application, Publication No. 2016-64474).

In this human-cooperative robot system, the robot is provided with various sensors, such as a force sensor, for detecting the operating state thereof. In a case in which the physical quantity associated with the operating state of the robot, which is detected by the various sensors, is equal to or greater than a first threshold and less than a second threshold, the robot is caused to perform a retreating operation, and in a case in which the physical quantity is equal to or greater than the second threshold, the robot is quickly stopped.

SUMMARY

An aspect of the present invention is a human-cooperative robot system including a robot and a control device that controls the robot, wherein: the robot is provided with a sensor that detect an external force applied to the robot; and the control device stops an operation of the robot in a case in which the detected external force is equal to or greater than a first threshold, and issues a warning in a case in which the detected external force is equal to or greater than a second threshold exceeding the first threshold.

In the abovementioned aspect, the control device may cause the robot to perform a retreating operation in a direction in which the external force is reduced, in a case in which the external force detected by the sensor is equal to or greater than a third threshold, which is smaller than the first threshold, and less than the first threshold.

In the abovementioned aspect, the warning may be issued by causing the robot to operate in a vibrating manner.

In the abovementioned aspect, the control device may be provided with an alarm device, and the warning may be issued by activating the alarm device.

DETAILED DESCRIPTION

A human-cooperative robot system 1 according to an embodiment of the present invention will be described below with reference to the drawings.

Figure 1:
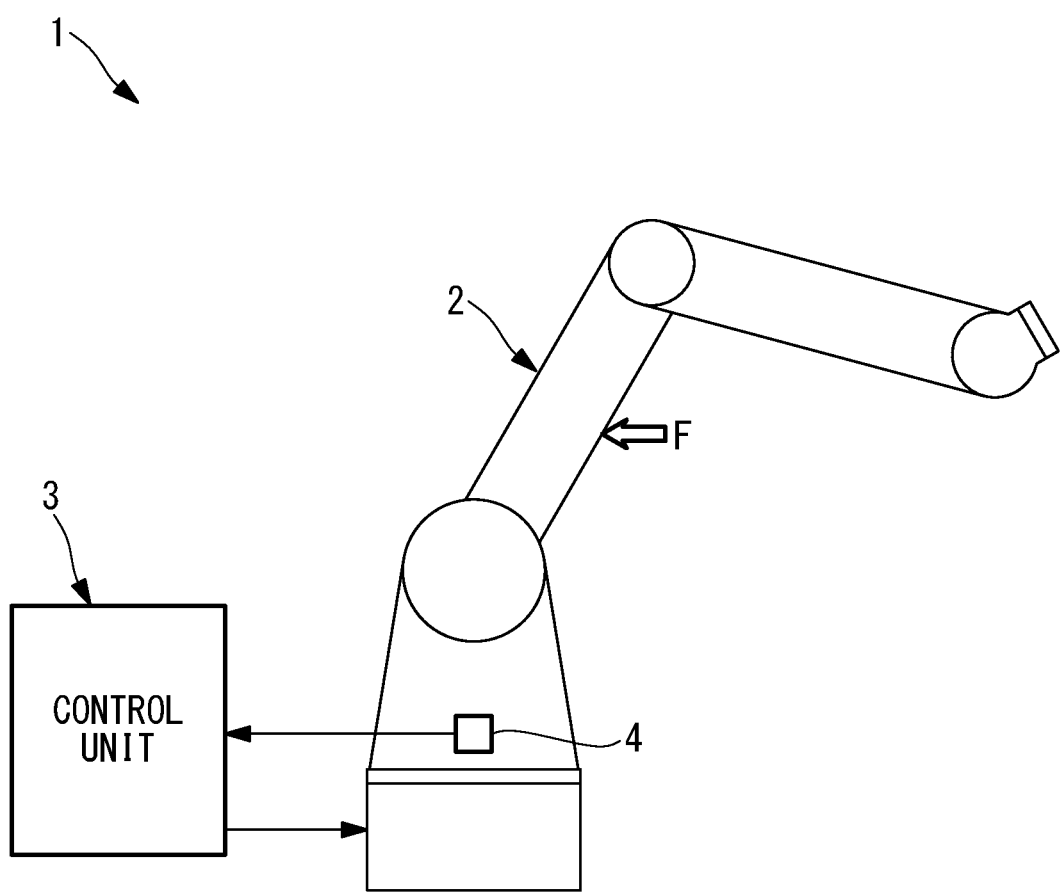
FIG. 1 is an overall configuration diagram showing a human-cooperative robot system according to an embodiment of the present invention.

As shown in FIG. 1, the human-cooperative robot system 1 according to this embodiment is a system that operates in an environment where a robot 2 and a worker (human) share a work space, and is provided with the robot 2 and a control device (control unit) 3 that controls the robot 2.

As shown in FIG. 1, the robot 2 is, for example, a six-axis articulated robot. The robot 2 can be operated so as to adopt a desired position and orientation by means of servomotors (not shown) provided at six joint shafts.

The robot 2 is provided with various sensors 4 for detecting the operating state thereof. The sensors 4 include, for example, a sensor 4 for detecting an external force F that acts on the robot 2, a torque sensor (not shown) for detecting a torque that acts on each of the joint shafts of the robot 2, an acceleration sensor (not shown) for detecting the acceleration of the robot 2, encoders (not shown) for detecting the rotational positions of the servomotors, and so forth. Each of the sensors 4 may be incorporated in the robot 2 or may be attached to the outside of the robot 2.

The control device 3 is a computer having a hardware configuration such as an interface that transmits/receives signals or data to/from a CPU, a RAM, a ROM as well as external devices, such as a display device and an input device.

Figure 2:
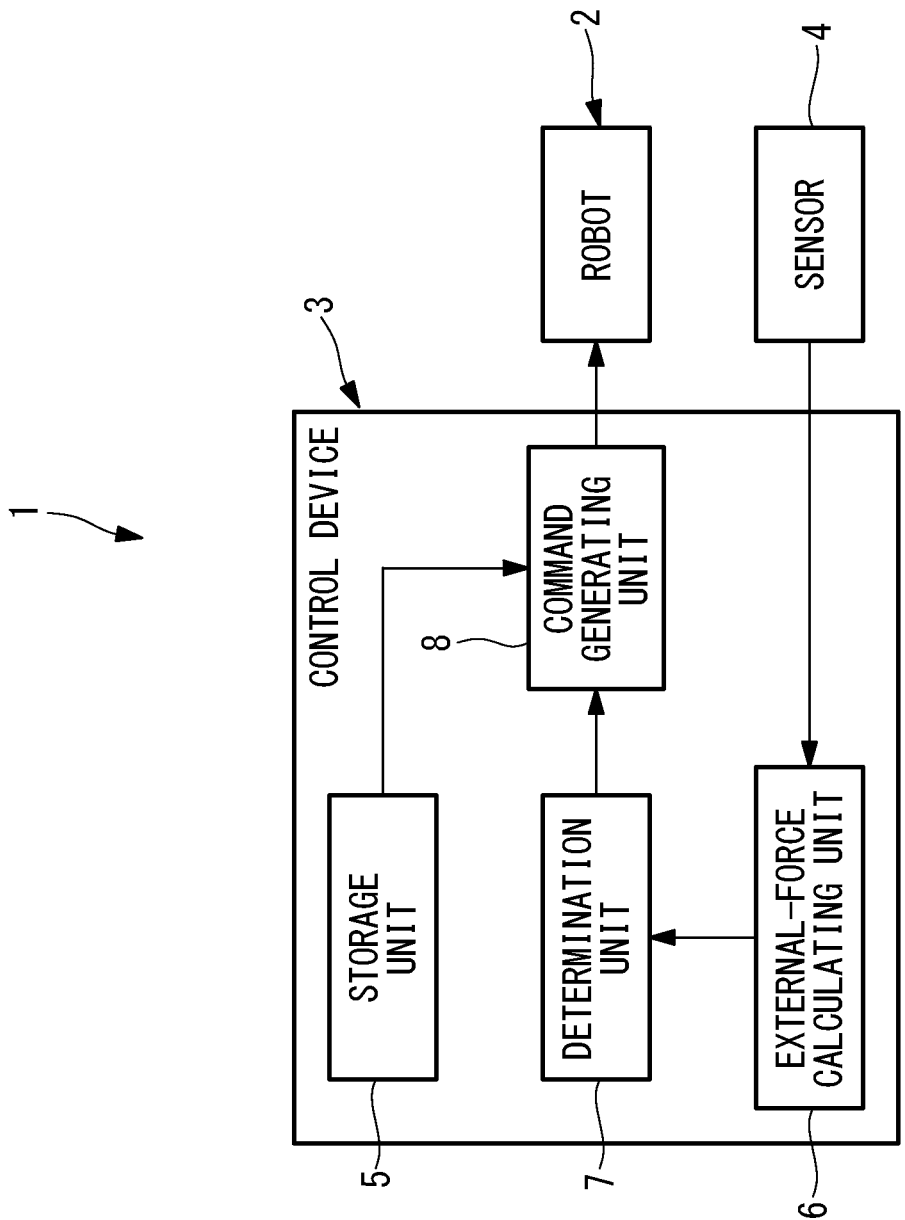
FIG. 2 is a block diagram for explaining a control device of the human-cooperative robot system in FIG. 1.

As shown in FIG. 2, the control device 3 is provided with: a storage unit 5 that stores an operation program; an external-force calculating unit 6 that calculates an external force F that acts on the robot 2 on the basis of information detected by the various sensors 4 provided in the robot 2; a determination unit 7 that determines whether or not the calculated external force F is equal to or greater than a third threshold Th3 and less than a first threshold Th1, is equal to or greater than the first threshold Th1 and less than a second threshold Th2, or is equal to or greater than the second threshold Th2; and a command generating unit 8 that generates, on the basis of the operation program or the determination result, a command for causing the robot 2 to perform an operation. The second threshold Th2 is set to a value sufficiently smaller than an external force F that could damage the robot 2.

Figure 3:
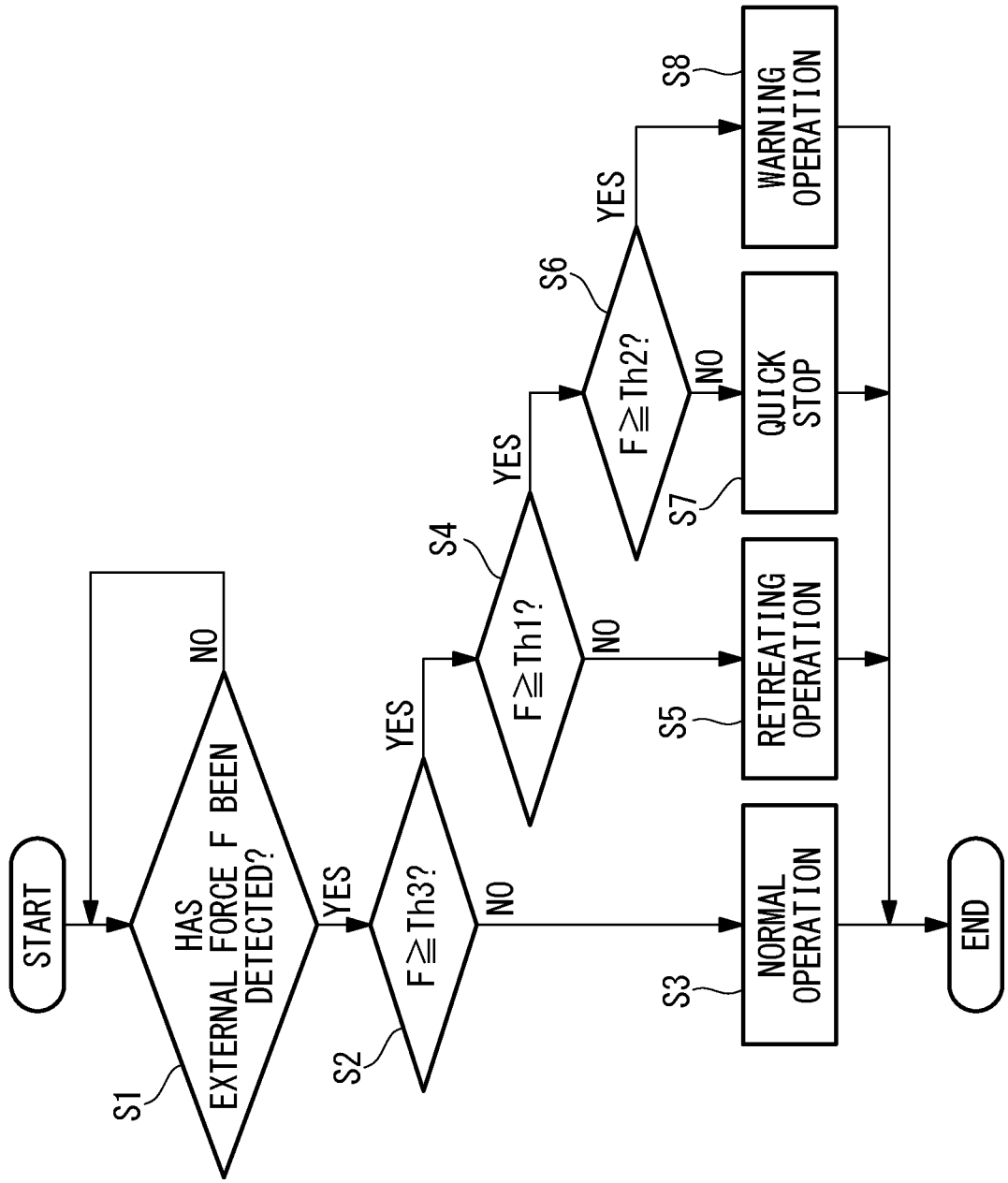
FIG. 3 is a flowchart for explaining a determination procedure performed by a determination unit of the control device in FIG. 2.

As shown in FIG. 3, the command generating unit 8 determines, in a state in which a command based on the operation program is generated and the robot 2 is caused to perform a normal operation, whether or not an external force F has been detected, on the basis of the information detected by the sensors 4 (step S1). In a case in which an external force F has been detected, the command generating unit 8 determines whether or not the external force F is equal to or greater than the third threshold Th3 (step S2).

Figure 4:
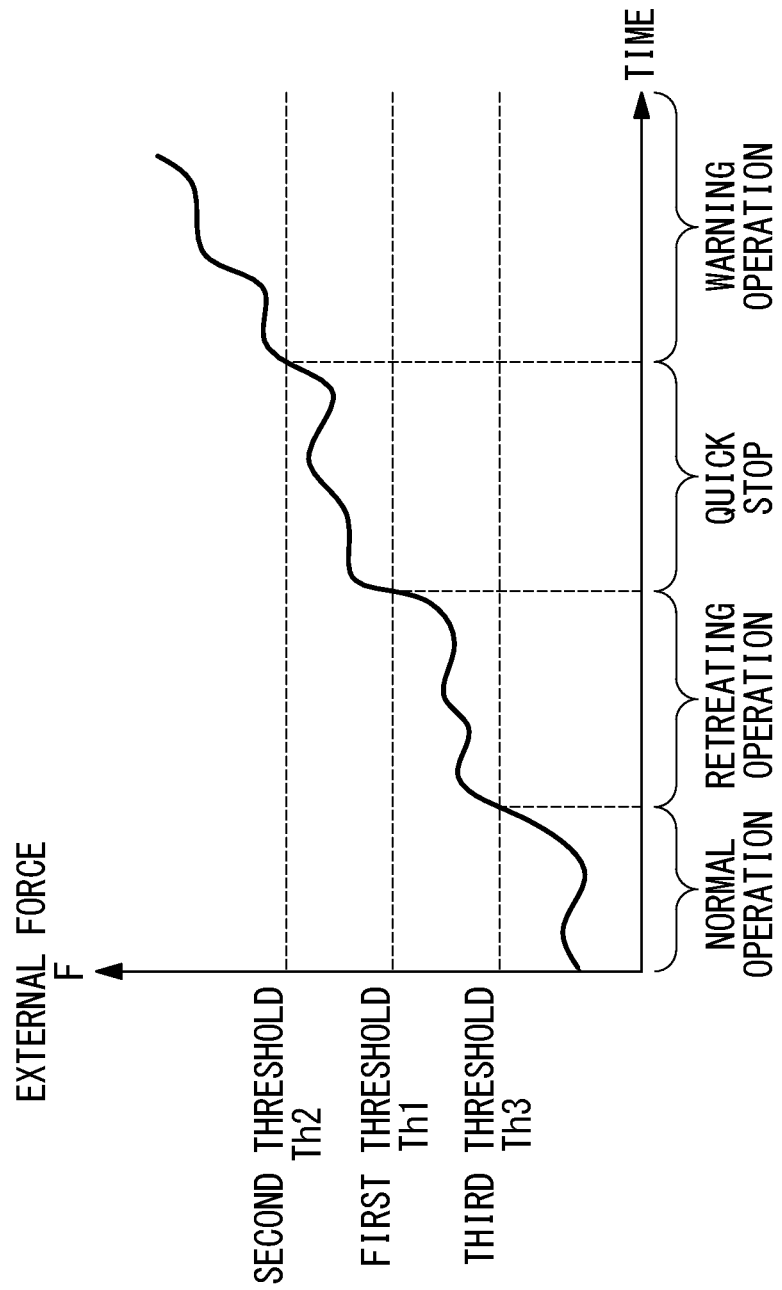
FIG. 4 is a graph showing a relationship between the magnitude of an external force applied to a robot of the human-cooperative robot system in FIG. 1 and an operation of the robot.

As shown in FIGS. 3 and 4, in a case in which the external force F is less than the third threshold Th3, a command for continuing the normal operation based on the operation program is generated (step S3). As a result of determination by the determination unit 7, if the external force F is equal to or greater than the third threshold Th3, it is determined whether or not the external force F is equal to or greater than the first threshold Th3 (step S4). If the external force F is less than the first threshold Th3, a command for causing the robot 2 to stop in a longer stopping time compared to the case of "quick stop" or a command for causing the robot 2 to perform a retreating operation in a direction in which the external force F decreases is generated (step S5).

As a result of determination by the determination unit 7, in a case in which the external force F is equal to or greater than the first threshold Th1, it is determined whether or not the external force F is equal to or greater than the second threshold Th2 (step S6). In a case in which the external force F is less than the second threshold Th2, the command generating unit 8 generates a command for causing the robot 2 to perform "quick stop", in other words, to stop in a short time (step S7).

As a result of determination by the determination unit 7, in a case in which the external force F is equal to or greater than the second threshold Th2 (step S6), the command generating unit 8 generates a command for executing a warning (step S8).

In this embodiment, the command generating unit 8 generates a command for causing the servomotor to operate in a vibrating manner so that a body of the robot 2 is vibrated, thereby giving a warning to the worker who is in contact with the robot 2 and pressing the robot 2.

The operation of the thus-configured human-cooperative robot system 1 according to this embodiment will be described below.

With the human-cooperative robot system 1 according to this embodiment, the control device 3 causes the robot 2 to operate on the basis of the operation program taught in advance, thereby allowing the robot 2 to perform work in a work space shared with a worker.

In this state, when the robot 2 needs to be made to retreat for some reason, the worker directly presses, with his/her hand, a surface of the robot 2 in a direction in which the robot 2 is to be made to retreat. An experienced worker is aware of the magnitude of the pressing force capable of causing the robot 2 to perform a retreating operation, and in a case in which the external force F detected by the various sensors 4 is equal to or greater than the third threshold Th3 and less than the first threshold Th1, the robot 2 is caused to perform the retreating operation.

Even if the worker tries to make the robot 2 perform the retreating operation, the control device 3 quickly stops the robot 2 when the external force F becomes equal to or greater than the first threshold Th1 and less than the second threshold Th2. When the robot 2 quickly stops, an experienced worker can recognize that the applied external force F was too large. However, when the robot 2 quickly stops, an inexperienced worker may misunderstand that the external force F being applied is insufficient and apply an even larger external force F.

Figure 5:
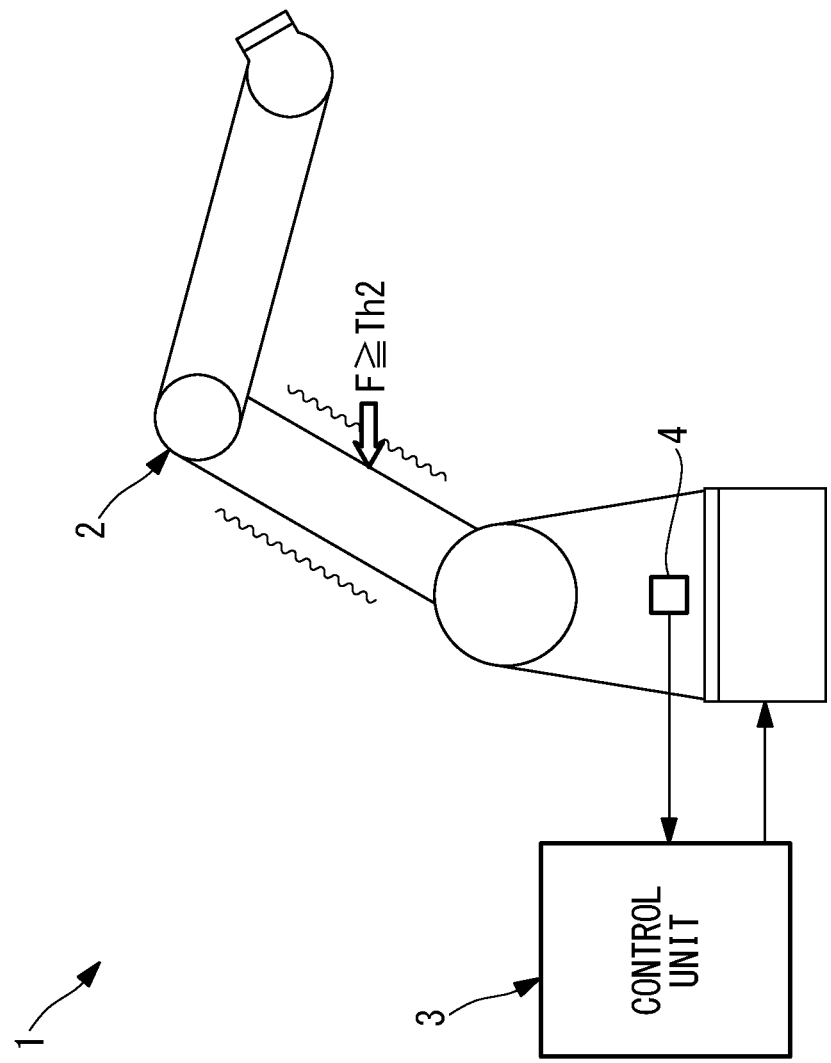
FIG. 5 is a diagram for explaining a warning operation performed when an external force that is equal to or greater than a second threshold acts on the robot in the human-cooperative robot system in FIG. 1.

In this embodiment, as shown in FIG. 5, when the external force F becomes equal to or greater than the second threshold Th2 as a result of the worker applying an even larger external force to the robot 2 stopped in this way, the control device 3 issues a warning by causing the robot 2 to operate in a vibrating manner. By doing so, the body of the robot 2, with which the worker is in contact, is vibrated, thus allowing the worker to recognize that the operation is wrong.

In other words, there is an advantage in that it is possible to prevent the robot 2 from being subjected to an excessive load even when operated by an inexperienced worker.

In this embodiment, the control device 3 gives a warning to the worker who is in contact with the robot 2 by causing the robot 2 to operate in a vibrating manner; thus, there is also an advantage in that it is not necessary to install a special alarm device.

Figure 6:
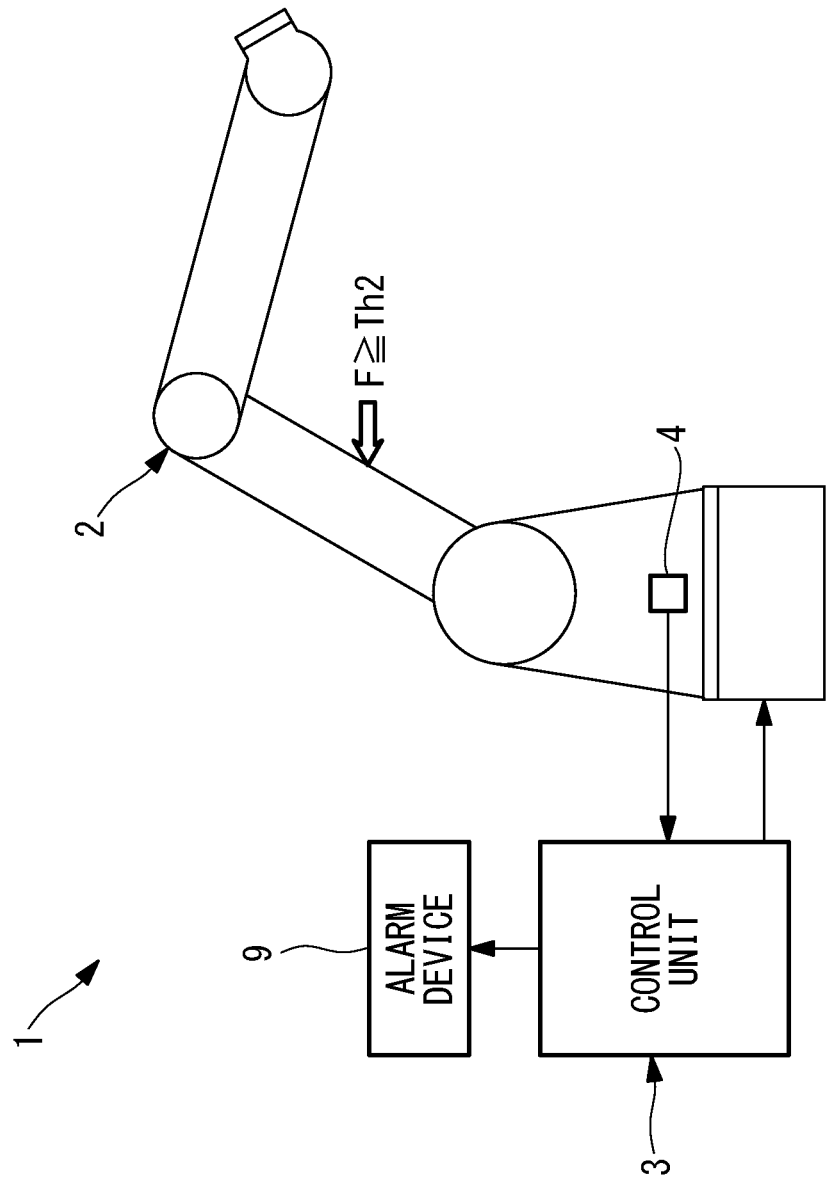
FIG. 6 is an overall configuration diagram showing a modification of the human-cooperative robot system in FIG. 1.
Figure 7:
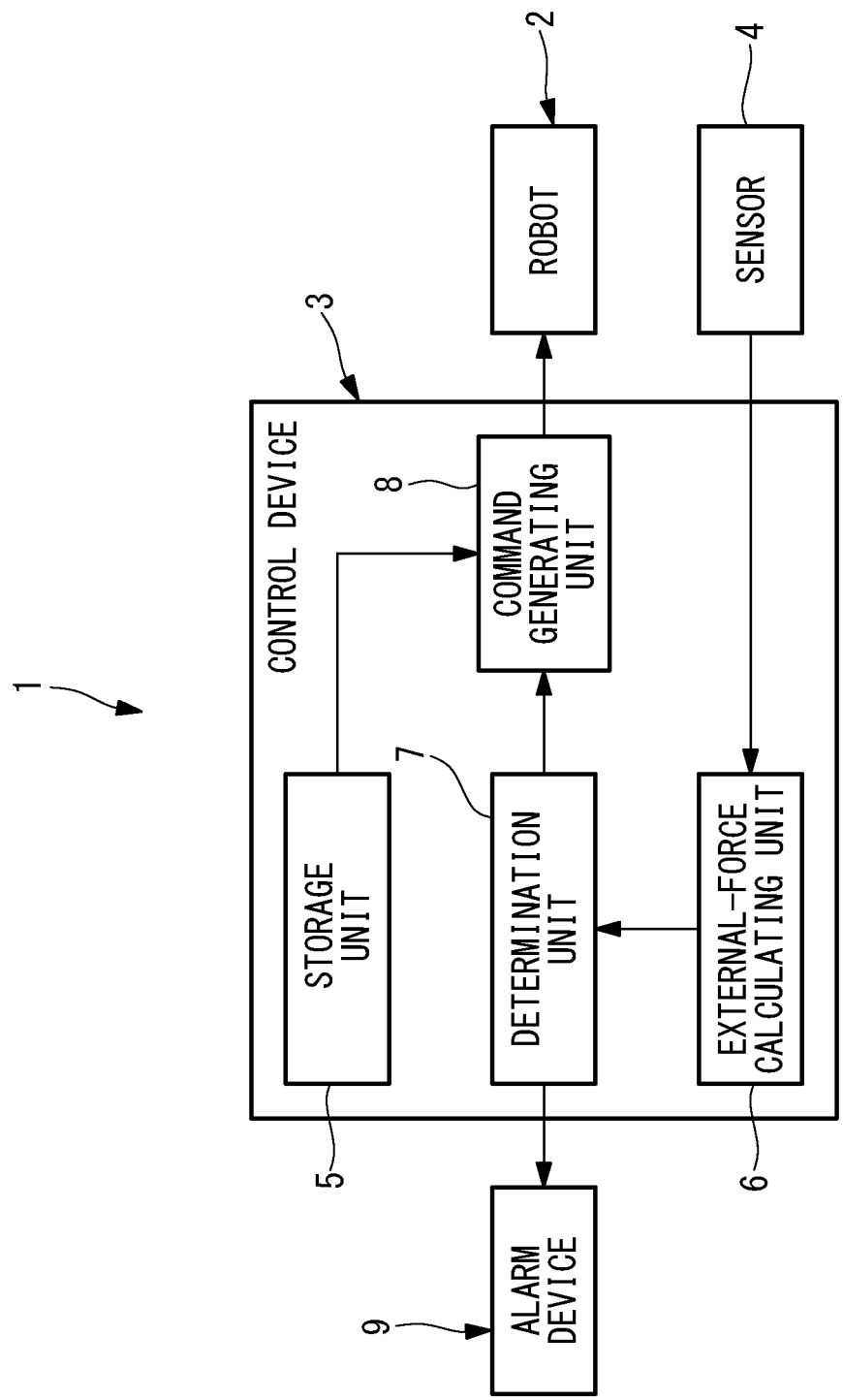
FIG. 7 is a block diagram for explaining a control device of the human-cooperative robot system in FIG. 6.

In the human-cooperative robot system 1 according to this embodiment, although a case in which the control device 3 gives a warning to the worker who is in contact with the robot 2 by causing the robot 2 to operate in a vibrating manner has been illustrated as an example, alternatively, as shown in FIGS. 6 and 7, an alarm device 9 may be provided, and the warning may be given to the worker by activating the alarm device 9.

As the alarm device 9, an arbitrary alarm device, such as a speaker for generating sound, a light that blinks or illuminates, and a display device for displaying the warning, may be employed.

As a result, the following aspect is derived from the above described embodiment.

An aspect of the present invention is a human-cooperative robot system including a robot and a control device that controls the robot, wherein: the robot is provided with a sensor that detect an external force applied to the robot; and the control device stops an operation of the robot in a case in which the detected external force is equal to or greater than a first threshold, and issues a warning in a case in which the detected external force is equal to or greater than a second threshold exceeding the first threshold.

With this aspect, in a case in which the robot and a worker share a work space, when an external force acts on the robot as a result of the worker pressing the robot, the external force is detected by the sensor, and the robot performs an operation corresponding to the detected external force. In the case in which the detected external force is equal to or greater than the first threshold, the control device stops the operation of the robot. If the robot stops even when the robot is being pressed, an experienced worker can recognize that an excessive force is applied.

In contrast, an inexperienced worker may misunderstand that the robot has stopped due to insufficient force, and in such a case, the worker applies a larger external force to the robot. In this case, with this aspect, the control device issues a warning when the external force detected by the sensor becomes equal to or greater than the second threshold exceeding the first threshold. By issuing the warning, even an inexperienced worker can be made to recognize that some kind of trouble has occurred, and it is possible to prevent the worker from applying an even larger external force to the robot.

In the abovementioned aspect, the control device may cause the robot to perform a retreating operation in a direction in which the external force is reduced, in a case in which the external force detected by the sensor is equal to or greater than a third threshold, which is smaller than the first threshold, and less than the first threshold.

With this configuration, the worker can make the robot perform the retreating operation by applying the external force that is equal to or greater than the third threshold and less than the first threshold to the robot, thus moving the robot in the direction of the external force. Then, it is possible to stop the robot when the external force becomes equal to or greater than the first threshold.

In the abovementioned aspect, the warning may be issued by causing the robot to operate in a vibrating manner.

With this configuration, when the external force becomes equal to or greater than the second threshold, the robot is caused to operate in a vibrating manner. In a case in which the robot is pressed in one direction, it is normally not conceivable that the robot operates in a vibrating manner; thus, it is possible to warn the worker that some kind of trouble has occurred. Because the worker who has received the warning stops pressing the robot with a larger external force, it is possible to prevent the robot from being subjected to an excessive external force. By executing the warning with the operation of the robot, it is not necessary to newly provide equipment such as an alarm device, thus allowing a simple configuration.

In the abovementioned aspect, the control device may be provided with an alarm device, and the warning may be issued by activating the alarm device.

With this configuration, when the external force becomes equal to or greater than the second threshold, the control device can activate the alarm device to issue the warning.

The invention claimed is:

1. A human-cooperative robot system, comprising:
   a robot; and
   a control device that controls the robot,
   wherein the robot is provided with a sensor that detects an external force applied to the robot, and
   wherein the control device stops an operation of the robot when the detected external force is equal to or greater than a first threshold, and if a further detection of the detected external force is equal to or greater than a second threshold exceeding the first threshold the control device issues a warning.

2. A human-cooperative robot system according to claim 1, wherein the control device causes the robot to perform a retreating operation in a direction in which the external force is reduced when the external force detected by the sensor is equal to or greater than a third threshold, which is smaller than the first threshold.

3. A human-cooperative robot system according to claim 1, wherein the warning is issued by causing the robot to operate in a vibrating manner.

4. A human-cooperative robot system according to claim 1, wherein:
   the control device is provided with an alarm device; and
   the warning is issued by activating the alarm device.

* * * * *